No. 790,252. PATENTED MAY 16, 1905.
L. J. DU MAHAUT.
GOLF BALL.
APPLICATION FILED DEC. 2, 1903.

WITNESSES:
Fred White
René Buine

INVENTOR:
Louis J. Du Mahaut,
By Attorneys,

No. 790,252. Patented May 16, 1905.

UNITED STATES PATENT OFFICE.

LOUIS J. DU MAHAUT, OF NEW YORK, N. Y., ASSIGNOR TO L. J. DU MAHAUT COMPANY, OF NEW YORK, N. Y., A CORPORATION OF NEW YORK.

GOLF-BALL.

SPECIFICATION forming part of Letters Patent No. 790,252, dated May 16, 1905.

Application filed December 2, 1903. Serial No. 183,537.

*To all whom it may concern:*

Be it known that I, LOUIS J. DU MAHAUT, a citizen of the United States, residing in the borough of Manhattan, city, county, and State of New York, have invented certain new and useful Improvements in Golf-Balls, of which the following is a specification.

This invention provides an improved construction of golf-ball which in its preferred form is characterized by the employment of a central core of cork, affording lightness with great resilience, and an intermediate layer or cushion of elastic rubber formed with projections at its outer surface and compressed within the usual outer covering or jacket of hard or tough rubber.

Figure 1:
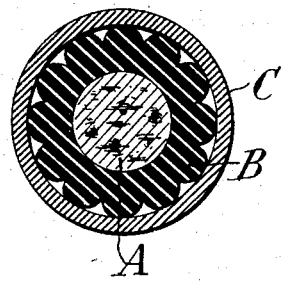
Figure 2:
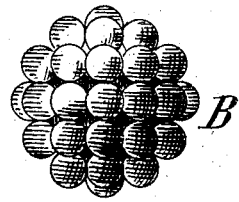
Figure 3:
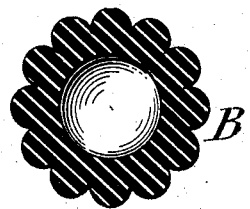
Figure 4:

Figure 1 of the accompanying drawings is a mid-section of the ball. Fig. 2 is an elevation of the intermediate cushion. Fig. 3 is a section of this cushion. Fig. 4 is an elevation of the inner core.

Referring to the drawings, A is the inner core, B the intermediate cushion, and C the outer covering or jacket.

The inner core A instead of being made of rubber or rubber composition or gutta-percha is preferably of cork, which affords a high degree of resiliency with the requisite firmness and a saving in weight. It may, however, be made of any suitable material.

The intermediate cushion B is preferably made of soft elastic rubber or rubber composition of suitable density and of a high degree of resiliency. It is preferably formed as a spherical shell with its outer surface diversified to form a succession of resilient projections, which are preferably in the form of knobs, each one of which constitutes a separate compressible cushion, these knobs being separated by spaces of sufficient width to allow of their lateral expansion when compressed by pressure from the exterior. The form of these knobs or projections may be greatly varied. The hemispherical form shown is preferred.

The outer jacket C is of the usual construction, being formed of a hard, tough, tenacious vulcanized rubber or rubber composition or of gutta-percha or kindred material.

In construction the inner core A may be supported by pins or otherwise in the center of the mold in which the cushion B is being molded and vulcanized, or the cushion B may be molded in halves, which may be cemented or vulcanized together, with the core A between them. The outer jacket is applied and vulcanized under compression in the ordinary manner. It is thus contracted upon and compresses the intermediate cushion, slightly flattening the projections thereof.

My improved golf-ball is designed to afford the maximum resilience and minimum weight, while being cheaper in construction than those heretofore made.

What I claim is—

1. A golf-ball having an inner member having resilient projections, and an outer jacket contacting with such projections, said outer jacket and said inner member being spaced apart between such projections.

2. A golf-ball having an inner member of elastic rubber having projections, and an outer jacket contacting with such projections, said outer jacket and inner member being spaced apart between such projections.

3. A golf-ball having a cushion of elastic rubber having projecting portions and contiguous spaces into which such portions may expand, said spaces being normally unoccupied by portions of the ball.

4. A golf-ball having a central core and an outer jacket, and between the two a member having resilient portions and contiguous spaces, said spaces being unoccupied by said outer jacket, and being adapted to receive such projections when they are expanded laterally.

5. A golf-ball having a central core and an outer jacket, and between the two a cushion consisting of a spherical shell of elastic rubber formed with projections and contiguous spaces, said spaces being unoccupied by said outer jacket.

6. A golf-ball having an inner member formed with elastic projections, and an outer jacket having a substantially undiversified inner surface, said inner member being under compression within said jacket.

7. A golf-ball comprising a central core, an outer jacket, and an intermediate cushion of elastic rubber having projections on its outer surface, and spaces into which said projections may laterally expand, said cushion being under compression within said jacket, and said spaces being unoccupied by said jacket.

8. A golf-ball comprising a central core, an outer jacket, and an intermediate cushion of elastic rubber having on its outer surface rounded projections and spaces into which said projections may laterally expand, said cushion being under compression within said jacket, and said spaces being unoccupied by said jacket.

In witness whereof I have hereunto signed my name in the presence of two subscribing witnesses.

LOUIS J. DU MAHAUT.

Witnesses:
 EUGENE V. MYERS,
 THOMAS F. WALLACE.